Dec. 15, 1925.
A. E. MELSON
VALVE
Filed May 23, 1925
1,565,485
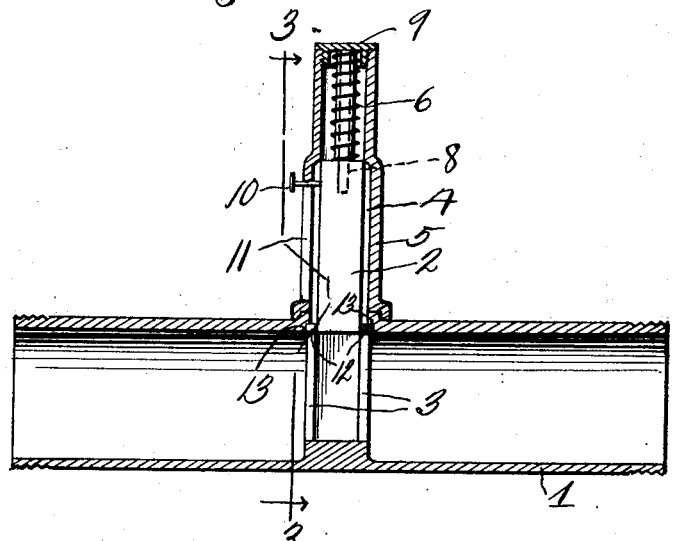
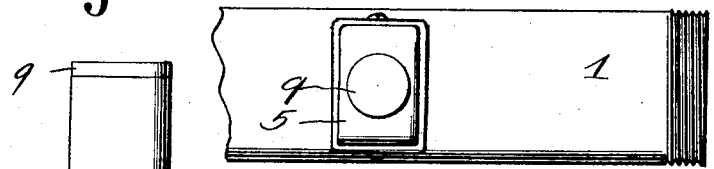
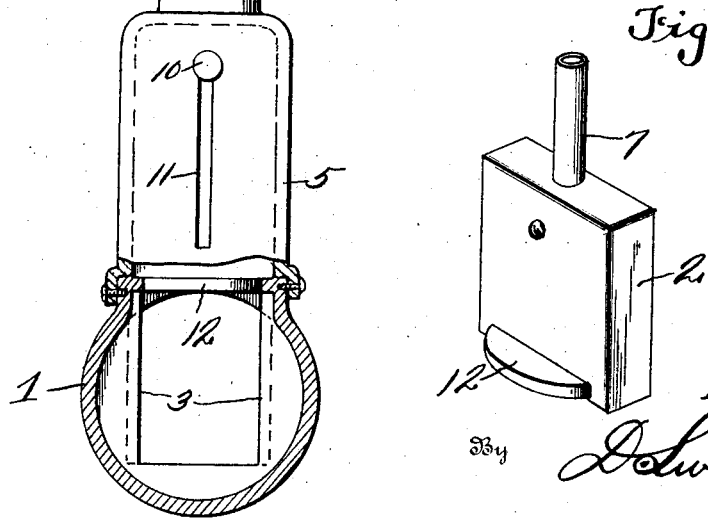
Inventor
A.E. Melson
By D. Swift
Attorney Patented Dec. 15, 1925.

UNITED STATES PATENT OFFICE.

ALLEN E. MELSON, OF MAYNARD, OHIO.

VALVE.

Application filed May 23, 1925. Serial No. 32,356.

*To all whom it may concern:*

Be it known that I, ALLEN E. MELSON, a citizen of the United States, residing at Maynard, in the county of Belmont, State of Ohio, have invented a new and useful Valve; and I do hereby declare the following to be a full, clear, and exact description of the invention, such as will enable others skilled in the art to which it appertains to make and use the same.

The invention relates to valves particularly adapted for use in connection with gas pipes, and has for its object to provide a valve whereby upon loss of pressure in the gas pipe, the valve will automatically close, and upon resumption of pressure in the gas pipe the valve will remain closed until manually opened, thereby obviating danger of persons being asphyxiated in rooms where lights were burning at the time of loss of pressure.

A further object is to provide a valve comprising a casing through which gas flows, and a slidable gate valve mounted in guides and opposite sides of the casing, and entirely received within an extension of the casing when in open position, spring means for normally forcing said gate valve to closed position, and a pin carried by the gate valve and extending through an elongated slot in the casing extension and forming means whereby the gate valve may be manually opened. Also to provide sleeve and shaft means for the gate valve for preventing binding of the valve, and around which the coiled spring extends.

A further object is to provide the lower end of the gate valve with arcuately shaped oppositely disposed extensions which are received in seats in the upper end of the casing when the valve is in open position, thereby in connection with the valve, preventing escape of air to the extension casing and to the atmosphere.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical longitudinal sectional view through the valve.

Figure 2 is a top plan view of the valve.

Figure 3 is a vertical transverse sectional view through the valve taken on line 3—3 of Figure 1.

Figure 4 is a perspective view of the gate valve.

Referring to the drawing, the numeral 1 designates the main casing of the valve through which gas flows in either direction through various burners throughout a house. One of the main dangers of the use of illuminating gas for lighting and heating purposes is when pressure is lost on the main supply line, the lights in the various rooms are extinguished, and upon resumption of pressure the gas will be discharged into the various rooms, and where persons are asleep therein, they are often asphyxiated. To obviate the above difficulties a slidable gate valve 2 is provided, which gate valve is slidably mounted between the guide ribs 3 at opposite sides of the chamber of the casing 1, and which ribs have a close ground connection. Under normal condition the valve 2 is held within the chamber 4 of the extension casing 5 by the pressure in the pipe line, and upon loss of pressure within the valve casing 1 the gate valve 2 is forced downwardly under the influence of the coiled spring 6 where it will cut off the flow of gas through the casing 1 upon resumption of flow of gas and pressure within the pipe line. Gate valve 2 is provided with an upwardly extending sleeve 7 which is slidably mounted on the downwardly extending shaft 8 carried by the removable cap 9, which is threaded on the other end of the extension casing 5. By providing the sleeve and shaft sliding connections, it will be seen that the gate valve will be accurately guided in its upward and downward movement, thereby preventing binding of the gate valve. When the valve is in closed position, it will be seen that the pressure is exerted thereon at a right angle to its direction of movement in its guides, thereby the pressure will not force the valve to open position, however when it is desired to open the valve, the operator grasps the pin 10 carried by one side of the valve 2, and which pin extends through a vertically elongated slot in the extension casing 5, and forces the same upwardly, which will move the valve into the chamber 4 of the extension casing, and its arcuately shaped extensions 12 at opposite sides of the valve into the similarly shaped valve seats 13 in the upper side of the chamber of the casing, thereby forming a tight non-leakable connection. When the valve is in raised position as shown in Figure 1, the pressure within the pipe line overcomes the expansive power of the coiled spring 6, and maintains the valve in open position until loss of pressure as above set forth.

From the above it will be seen that an automatic safety valve is provided for gas pipe lines which is simple in construction, positive in its operation, and one which will automatically cut off the flow of gas after the loss of pressure in the gas pipe, thereby eliminate danger of asphyxiation of occupants in various rooms of a building.

The invention having been set forth what is claimed as new and useful is:—

1. A pressure controlled valve for gas pipe lines comprising a casing, vertically disposed spaced guide ribs at opposite sides of the casing, an extension casing carried by said casing, a gate valve slidably mounted in the extension casing and adapted to move downwardly between the spaced guide ribs, a guide sleeve carried by said valve, a removable cap carried by the extension casing, a guide rod carried by said cap and extending into the sleeve, a coiled spring surrounding the sleeve and interposed between the cap and the valve and a handle member carried by the valve and extending outwardly through a vertically elongated slot in the side of the extension casing and forming means whereby the valve may be manually moved to open position.

2. A gas pressure controlled valve comprising a casing, an extension casing, a gate valve slidably mounted in the extension casing and between spaced guide ribs in the casing, said guide ribs forming a valve seat for opposite sides of the valve, telescopically engaged guide members carried by the extension casing and the valve and an expansible spring surrounding the guide members and forming means whereby said gate valve will be forced downwardly upon relief of pressure within the casing, manual means whereby said valve may be moved to open position, said valve at its inner end being provided with oppositely extending integral members cooperating with oppositely disposed valve seats adjacent the upper ends of the guide ribs.

3. The combination with a gas pipe line pressure controlled gate valve slidably mounted and guided between spaced guide ribs engaging opposite sides of the gate valve, of valve extensions carried by the end of the gate valve and cooperating with valve seats adjacent the upper ends of the guide ribs and between oppositely disposed guide ribs.

In testimony whereof I have signed my name to this specification.

ALLEN E. MELSON.